United States Patent [19]

Stevens

[11] 4,394,096
[45] Jul. 19, 1983

[54] ATTACHMENT SYSTEM FOR PLASTIC LINERS

[75] Inventor: Bruce W. Stevens, Roanoke, Ind.

[73] Assignee: Menasha Corporation, Neenah, Wis.

[21] Appl. No.: 297,023

[22] Filed: Aug. 27, 1981

[51] Int. Cl.$^3$ .......................... B25G 3/00; F16B 2/14; F16B 21/80; F16G 3/00
[52] U.S. Cl. ................................... 403/408; 403/388; 411/373; 52/311
[58] Field of Search ....................... 403/388, 408, 291; 411/373, 375, 377, 396; 52/311

[56] References Cited

U.S. PATENT DOCUMENTS 3,298,272  1/1967  Henderson ........................... 411/373
3,425,313  2/1969  Villo ..................................... 411/373
4,050,771  9/1977  Watson et al. ................... 403/408 X

FOREIGN PATENT DOCUMENTS 748582  11/1944  Fed. Rep. of Germany ...... 411/373
684821  12/1952  United Kingdom ................ 411/373
790051   2/1958  United Kingdom ................ 411/377

Primary Examiner—Wayne L. Shedd
Attorney, Agent, or Firm—Quarles & Brady

[57] ABSTRACT

A flush capped bolt system for attaching a plastic liner to a substrate includes a cap with a radial sealing skirt that seals against the walls of a counterbored recess at the liner surface. In the preferred embodiment, a squared portion on the bolt shank deforms a liner opening to provide a nonrotatable engagement, and there is a plastic wear washer to accommodate lateral movement allowed by an oversized substrate opening. The system is readily adapted for field installation using conventional tools.

6 Claims, 3 Drawing Figures

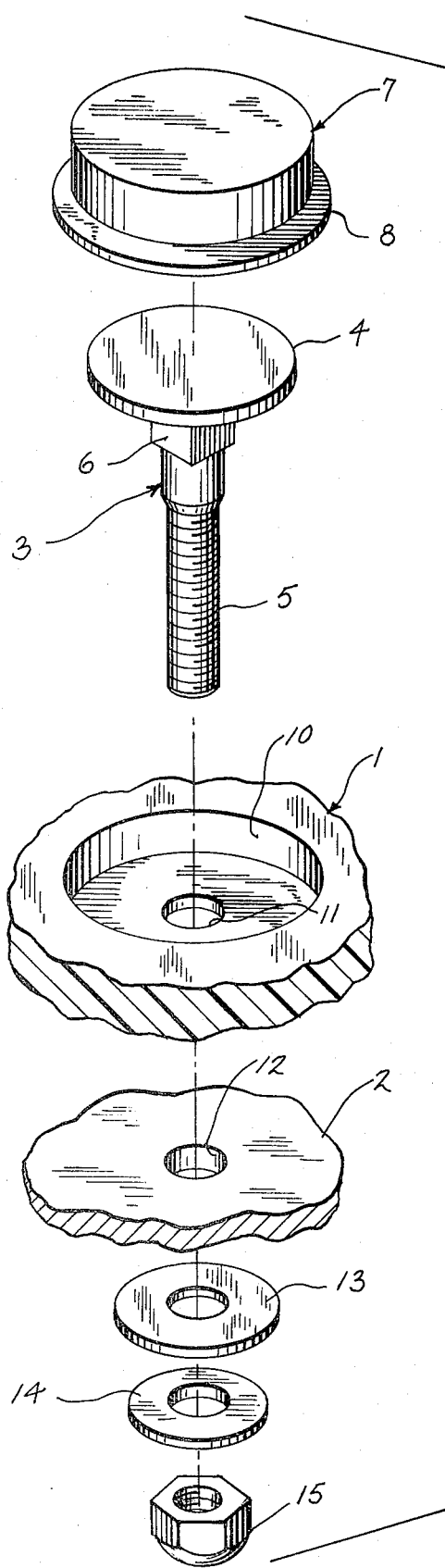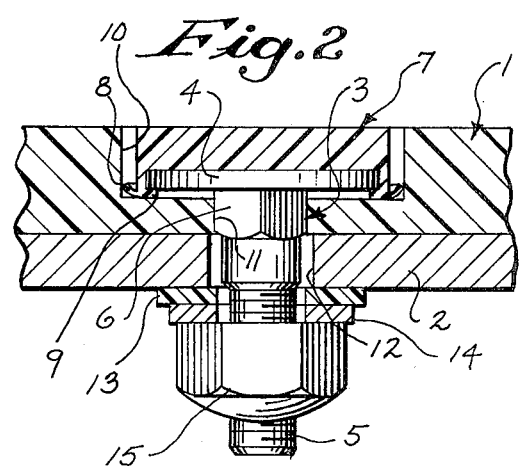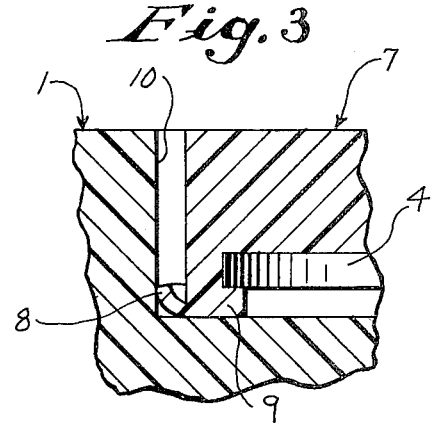

ATTACHMENT SYSTEM FOR PLASTIC LINERS

BACKGROUND OF THE INVENTION

This invention relates to attaching plastic liners, particularly but not only ultrahigh molecular weight polymers, to substrates. Such liners are often used, for example, to line hoppers, railroad car and truck bodies, and ship holds used for coal and other materials. UHMW liners are particularly desirable because the material provides flexibility and slipperiness with very high abrasion, impact and chemical resistance. Such materials can outwear steel in many applications, and the slipperiness of the material prevents the coal or other material from sticking or freezing to the substrate.

Such liners are, however, difficult to attach securely to the substrate. One particular problem in this regard is that the liner materials exhibit a relatively high degree of linear thermal expansion and contraction, and for this and other reasons glues and some other conventional arrangements are not suitable. The expansion and contraction problem can be solved by the known expedient of using bolts that extend through oversized holes in the substrate to allow lateral movement, but this can make the bolt difficult to attach.

It is also desirable and known to cap attachment bolts with plastic and make them flush with the liner surface to provide surface continuity for improved smoothness and wear. The closest known prior approach of this type involves using a frusto-conical bolt head that fits in a mating recess on the liner surface, but this is not totally satisfactory from the standpoints of holding the bolt against rotation, particularly while a nut is being attached, providing an adequate seal between the bolt head and the recess, allowing field installation using conventional tools, simplicity of manufacture, and general adaptability to various applications.

SUMMARY OF THE INVENTION

This invention contemplates an attachment system utilizing a bolt with a circular cylindrical cap received in a mating recess on the liner surface and provided with a radial sealing skirt that engages the walls of the recess to provided an effective seal. In the preferred embodiment, the bolt shank has a squared portion that is received through and deforms a shank opening in the liner to provide a nonrotatable engagement between the bolt and the liner, and the shank extends through an oversized substrate hole to receive a nut means including a plastic washer that is against the underside of the substrate to allow lateral movement and prevent excessive wear resulting therefrom. The system is readily adaptable to a wide variety of applications, and the liner can easily be attached in the field using conventional tools. The entire system is extremely effective, while being relatively simple and inexpensive to manufacture and use.

Other objects and advantages will appear from the description to follow.

BRIEF DESCRIPTION OF THE DRAWING

FIG. 1 is an exploded view in perspective illustrating a preferred embodiment of the invention;

FIG. 2 is a view in cross section showing the system of FIG. 1 in place; and

FIG. 3 is an enlarged fragmentary view in cross section showing the sealing skirt more clearly.

DESCRIPTION OF THE PREFERRED EMBODIMENT

The reference numeral 1 in the drawing indicates a plastic liner in the form of a sheet to be attached to a substrate using the system of the invention. In the preferred embodiment, the liner 1, and the cap and washer referred to below, are all of a suitable ultrahigh molecular weight polymer material, but the term "plastic" is not limited to such materials and is intended to include also all equivalent flexible materials for which the system would by suitable. The liner 1, which can be of any desired thickness or configuration, is attached to a substrate 2, which as shown is a steel sheet of the type used, for example, to form the walls of a hopper. As indicated above, the invention is usable in a wide variety of applications with various substrates and liners; the substrate and liner need not, for example, be completely flat sheets as shown.

The system includes a elevator bolt 3 having a circular disc-like head 4 and an attachment shank 5. In the preferred embodiment shown, the shank 5 is a conventional threaded shank that extends through the substrate 2 to receive a nut, but other arrangements, such as a shaft received with a friction fit by a socket in the substrate, might be used in certain cases. The shank 5 is provided near its upper end, under the head 4, with a squared portion 6.

A plastic cap 7 is mounted on the head 4. It is generally of a straight-sided, circular cylindrical configuration with a vertical dimension sufficient to make its upper surface flush with the exposed surface of the liner 1 when placed in the recess to be described; it is a particular advantage of the system of the invention that the cap 7 can easily be made of any required vertical dimension for a particular application. As seen clearly in FIG. 2, the cap 7 is recessed at its underside to receive the head 4, the circular periphery of the cap 7 extending downwardly past the circular periphery of the head 4. At its lower outer edge, the cap 7 is provided with a relatively thin, radially outwardly extending, circular sealing skirt 8, and a somewhat thicker radially inwardly extending circular mounting rim 9 that extends partially under the head 4 to trap the bolt 3 and hold it against vertical movement, although in the preferred embodiment shown relative rotational movement is possible about the axis of the shank 5. The cap 7 can be attached to the head 4 by heating it to cause expansion that allows the rim 9 to move over the head 4.

The upper or exposed surface of the liner 1 is provided with a circular cylindrical, straight sided recess 10 that extends downwardly only partially through the liner 1, and a smaller circular shank opening 11 that continues through the liner 1. As seen most clearly in FIG. 2, the cap 7 is peripherally smaller than the recess 10, or in other words, the diameter or periphery of the recess 10 is somewhat larger than the major diameter or pheriphery of the cap 7. The cap 7 is received in the recess 10 with its upper or exposed surface flush with the exposed surface of the liner 1. The skirt 8 is peripherally larger than the recess 10, or in other words its outer diameter or periphery is larger than that of the recess 10, and when the cap 7 is inserted in the recess 10 the skirt 8 is rolled up against the walls of the recess 10, as seen most clearly in FIG. 3, to provide a very effective seal in either direction. The specific dimensions of the parts will depend on a number of factors, including the specific plastic material being used. The thickness or vertical dimension of the skirt 8 in its initial state should be such as to allow uniform rolling up, given the flexibility and other characteristics of the specific plastic material. It has been found that the diameter of the recess 10 should be greater than the major diameter of the cap 7 plus twice the thickness of the skirt 8 to prevent difficult installation and shearing of the skirt 8. The diameter of the recess 10 should, however, be less than the outer diameter of the skirt 8 to provide an adequate seal. In the preferred embodiment shown, the diameter of the recess 10 is approximately equal to the major diameter of the cap 7 plus one-fourth of the difference between the major diameter of the cap 7 and the outer diameter of the skirt 8, although this may be varied depending on the thickness of the skirt 8. These and other dimensions, such as the thickness of the rim 9 and the depth of the recess 10 can all be readily determined for any particular application by those skilled in the art.

The shank opening 11 in the linear 1 is large enough to accommodate the shank 5, but is effectively smaller than the squared portion 6. When the bolt 3 is in place, the squared portion 6 is received in the opening 11, and deforms it into a non-circular configuration, thus providing a nonrotatable engagement between the bolt 3 and liner 1. This is particularly advantageous when attaching the nut means described below.

The shank 5 extends through a substrate shank opening 12. The opening 12 is substantially oversized or larger than the shank 5, which allows relative lateral movement of the bolt 3 and liner 1 with respect to the substrate 2 to accommodate linear expansion and contraction of the liner 1. On the opposite or bottom side of the substrate 2 is a nut assembly or means comprising a plastic washer 13 that is directly against the underside of the substrate 2, a steel washer 14 against the washer 13, and a conventional elastic or other lock nut 15 engaged with the threaded shank 5 and against the washer 14. The plastic washer 13 is preferred because of the contemplated relative laterial movement. It minimizes or eliminates abrasion wear on the steel washer resulting from such movement, and also prevents corrosion or freezing to the substrate which would hamper such movement.

Using the system of the invention, liner installation can easily be accomplished in the field using conventional tools. The liner will obviously be selected or cut for the particular substrate. Suitable attachment points will then be selected, and it is a particular advantage of the invention that pre-forming attachment points is not needed and they can readily be field-located where desired for the particular application. Once these preliminaries have been accomplished, the liner 1 will first be drilled at the selected location or locations to form, in each case, the recess 10 and shank opening 11; a simple conventional counterbore tool can be used for this purpose. The liner 1 can then be used as a template to locate the substrate shank opening 12, whereupon the liner is removed and the hole 12 drilled using a conventional drill. The bolt 3, with the cap 7 in place, is then inserted through the aligned openings and the nut means attached to complete the installation.

While the preferred embodiment of the invention shown and described provides all of the indicated advantages, it will be obvious that various modifications might be made without departure from the spirit of the invention. By way of additional example over those already mentioned, the cap and recess need not be circular. The invention is not, therefore, intended to be limited by the showing or description herein, or in any other manner, except insofar as may specifically be required.

I claim:

1. In a system attaching a plastic liner to a substrate using a bolt with a plastic capped head that is received in an enlarged recess at the exposed liner surface to be flush with said surface and that has an attachment shank that extends through a shank opening in the liner at the bottom of the recess and into the substrate, the improvement wherein:
the recess is straight-sided; the cap is straight-sided and includes a pheripheral portion that extends around the periphery of the bolt head and is peripherally smaller than the recess; and the peripheral portion includes a radially outwardly extending sealing skirt that is peripherally larger than the recess and is rolled upwardly when the bolt is inserted into a sealing engagement with the sides of the recess.

2. A system according to claim 1, wherein: the cap peripheral portion also includes a radially inwardly extending rim that extends partially under the bolt head and holds the cap thereon.

3. A system according to claim 1, wherein: the recess, cap peripheral portion and skirt are all circular.

4. A system according to claim 3, wherein:
the shank opening in the liner is circular; and the bolt shank has a non-circular portion that is deformingly received in and deforms the liner shank opening providing a non-rotatable engagement between the bolt and liner.

5. A system according to claim 4, and in which the substrate has an oversized shank opening aligned with the liner shank opening, the shank extends through the substrate shank opening beyond the opposite surface of the substrate, and a nut means engages the shank and bears against the opposite surface of the substrate, wherein:
the nut means includes a plastic washer that bears directly against the opposite surface of the substrate.

6. A system according to claim 5, wherein:
the cap peripheral portion also includes a radially inwardly extending rim that extends partially under the bolt head holding the cap thereon.

* * * * *